US008732839B2

(12) United States Patent
Hohl

(10) Patent No.: US 8,732,839 B2
(45) Date of Patent: May 20, 2014

(54) AUTOMATICALLY PROTECTING COMPUTER SYSTEMS FROM ATTACKS THAT EXPLOIT SECURITY VULNERABILITIES

(75) Inventor: Fritz Hohl, Stuttgart (DE)

(73) Assignee: Sony Corporation, Tokyo (JP)

( * ) Notice: Subject to any disclaimer, the term of this patent is extended or adjusted under 35 U.S.C. 154(b) by 799 days.

(21) Appl. No.: 12/296,479

(22) PCT Filed: Jul. 31, 2007

(86) PCT No.: PCT/EP2007/006766
§ 371 (c)(1),
(2), (4) Date: Oct. 8, 2008

(87) PCT Pub. No.: WO2009/015671
PCT Pub. Date: Feb. 5, 2009

(65) Prior Publication Data
US 2010/0257610 A1    Oct. 7, 2010

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC .......................................................... 726/25

(58) Field of Classification Search
USPC .......................................................... 726/25
See application file for complete search history.

(56) References Cited

U.S. PATENT DOCUMENTS

| 2003/0056116 | A1* | 3/2003 | Bunker et al. | 713/201 |
|---|---|---|---|---|
| 2003/0131152 | A1 | 7/2003 | Erlingsson | |
| 2004/0260940 | A1 | 12/2004 | Berg et al. | |
| 2005/0010812 | A1* | 1/2005 | Terrell et al. | 713/201 |
| 2005/0022028 | A1* | 1/2005 | Hall | 713/201 |
| 2005/0198520 | A1 | 9/2005 | Bardsley et al. | |
| 2006/0021054 | A1* | 1/2006 | Costa et al. | 726/25 |
| 2006/0265324 | A1* | 11/2006 | Leclerc et al. | 705/38 |
| 2007/0016948 | A1* | 1/2007 | Dubrovsky et al. | 726/22 |
| 2007/0094260 | A1 | 4/2007 | Murphy et al. | |

OTHER PUBLICATIONS

"A process for performing security code reviews" Security & Privacy, IEEE (vol. 4, Issue: 4) Date of Publication: Jul.-Aug. 2006, Howard, M.A. Security Eng., Microsoft, Redmond, WA.*

* cited by examiner

*Primary Examiner* — Yin-Chen Shaw
*Assistant Examiner* — Harris Wang
(74) *Attorney, Agent, or Firm* — Oblon, Spivak, McClelland, Maier & Neustadt, L.L.P.

(57) ABSTRACT

A first method for automatically protecting a computer system from attacks that exploit security vulnerabilities detects requests for execution of code portions, determines vulnerabilities of a code portion for which an execution request is detected, evaluates whether or not the execution of the code portion shall be prevented in a case at least one vulnerability concerning the code portion is determined, and prevents execution of the code portion if determined to do so in the evaluation. A second method for automatically protecting a computer system from attacks that exploit security vulnerabilities detects code portions which are currently executed, determines vulnerabilities of a code portion that is currently executed, evaluates whether or not the execution of the code portion shall be aborted in a case at least one vulnerability concerning the code portion is determined, and aborts execution of the code portion if determined to do so in the evaluation.

19 Claims, 3 Drawing Sheets

AUTOMATICALLY PROTECTING COMPUTER SYSTEMS FROM ATTACKS THAT EXPLOIT SECURITY VULNERABILITIES

FIELD OF THE INVENTION

The present invention relates to the field of computer system security. The present invention especially relates to methods and computer programs for automatically protecting a computer system from attacks that exploit security vulnerabilities.

DESCRIPTION OF THE RELATED PRIOR ART

A plurality of system, techniques and services are known which help to improve computer system security.

Vulnerability databases, for example, are (mainly public) databases that contain published vulnerability descriptions. These descriptions typically contain attributes like a discovery date, a name, a textual description, a list of affected code modules including their version numbers and required platforms (i.e. Operating Systems and/or hardware requirements), and some creditability evidence, e.g. the name of the discoverer. Examples are the services provided by Symantec (see http://securityresponse.symantec.com), the Open Source Vulnerability Database (see http://www.osvdb.org/), or by automatically archiving mailing lists like BugTraq (see http://www.securityfocus.com/archive/1) or Full Disclosure (see http://archives.neohapsis.com/archives/fulldisclosure/2006-01/).

Some operating systems provide a service for automatic download and installation of updates (including security fixes). This mechanism requires security fixes to be available and relates only to updates of the Operating System but not to general applications.

The Open Vulnerability and Assessment Language, or OVAL, is a standard for expressing how to check for the presence of vulnerabilities and configuration issues on computer systems, and how to report on the presence and absence of such issues. OVAL does not protect computer systems; instead it provides data formats on the basis of which a mechanism that can state whether a computer system contains a certain vulnerability or not can work.

Virus scanners examine files by referring to a dictionary of known viruses patterns that the authors of the virus scanner have identified. Virus scanners detect only viruses and malware. Viruses and malware however form only one part of possible attacks. For example, an attacker that uses a specially designed URL in order to exploit some cross scripting attacks, will never be detected by a virus scanner.

SUMMARY OF THE INVENTION

The object of the present invention is to further enhance computer security. To achieve this object, the present invention provides a first method for automatically protecting a computer system from attacks that exploit security vulnerabilities, comprising the steps of detecting requests for the execution of code portions, determining vulnerabilities of a code portion for which an execution request is detected, evaluating whether or not the execution of the code portion shall be prevented in case that at least one vulnerability concerning the code portion is determined and preventing the execution of the code portion if determined to do so in the evaluation step. To achieve the object, the present invention provides a second method for automatically protecting a computer system from attacks that exploit security vulnerabilities, comprising the steps of detecting code portions which are currently executed, determining vulnerabilities of a code portion which is currently executed, evaluating whether or not the execution of the code portion shall be aborted in case that at least one vulnerability concerning the code portion is determined and aborting the execution of the code portion if determined to do so in the evaluation step.

Thus, the present invention protects computer systems from attacks that exploit security vulnerabilities of code portions. By preventing or aborting the execution of a code portion, this is achieved without requiring fixes to the vulnerabilities, so that protection is achieved instantly a vulnerability is determined. Any method to automatically determine a vulnerability of a code portion may be employed. Starting a program and calling an external procedure are situations that can be detected and augmented with a prevention mechanism without the need to recompile or change the structure of existing applications. Thus the present invention can be employed with existing applications. In a simple implementation of the present invention, the evaluation step may be implemented trivially, so as to always abort or prevent the execution of the code portion, when a vulnerability of the code portion is detected. The computer system is not restricted to be a computer system of any kind. The computer system may, for example, be a personal computer providing a processor, input and output means, permanent and volatile storage means and networking capabilities.

Advantageously, in case of the first method, said code portion is a procedure external to a requesting code module issuing said request for execution, said method, in case that the execution of said code portion is prevented, further comprising the step of executing in place of said prevented code portion a shortcut procedure which ensures that said requesting code module can continue.

Advantageously, said vulnerabilities are known vulnerabilities.

Advantageously, for each code portion there is an associated code portion identifier, and the step of determining vulnerabilities of a code portion is based on a step of querying a database which holds associations of vulnerabilities with code portion identifiers, whereby a vulnerability is determined to be a vulnerability of the code portion when the database holds an association of the vulnerability with the code portion identifier of the code portion.

Advantageously, the method comprises a secure history determination step providing a secure history determination result indicating whether or not a parameter set used to call the code portion was used before the publication of the oldest vulnerability of the code portion wherein the step of evaluation is based on the secure history determination result. Alternatively, one or more parameter test procedures are defined, whereby each parameter test procedure of the one or more parameter test procedures is specific to a different one of said vulnerabilities and provides a result value when executed which indicates if a parameter set used to call the code portion exploits this vulnerability or not and whereby the step of evaluation is based on one or more of said result values of the one or more parameter test procedures. In this case, the method advantageously further comprises a secure history determination step providing a secure history determination result indicating whether or not a parameter set used to call the code portion was used before the publication of a first vulnerability of the code portion whereby the step of evaluation is based on the secure history determination result.

Advantageously, said first vulnerability is the oldest vulnerability of the code portion without a parameter test procedure.

Advantageously, the method further comprises a step of storing, whenever a code portion is executed, an identifier of the executed code portion together with a parameter set used to call the executed code portion and a time stamp, whereby the parameter set is stored based on a secure hash in case the parameter set is determined to require too large an amount of storage capacity.

Advantageously, the method further comprises the steps of determining which fixes need to be applied in order to allow for a secure execution of a code portion of which the execution is prevented or aborted and telling a user said fixes and/or applying said fixes.

Advantageously, the method further comprises the steps of determining what other code portion might be used instead of the one of which the execution was prevented or aborted and telling a user said other code portion.

The present invention can likewise be seen in a computer software product adapted to perform the steps of the first or the second method. The computer program product provides a protection system. The protection system typically will use the hard- and software infrastructure of the computer system it protects and the hard- and software infrastructure to which the computer system is connected. Thereby use is made of the storage, processing and communication facilities of the computer system. The protection system may also employ hardware specifically provided for facilitating the protection system.

BRIEF DESCRIPTION OF THE DRAWINGS

The present invention is explained with reference to drawings of which

DESCRIPTION OF THE PREFERRED EMBODIMENTS

Figure 1:
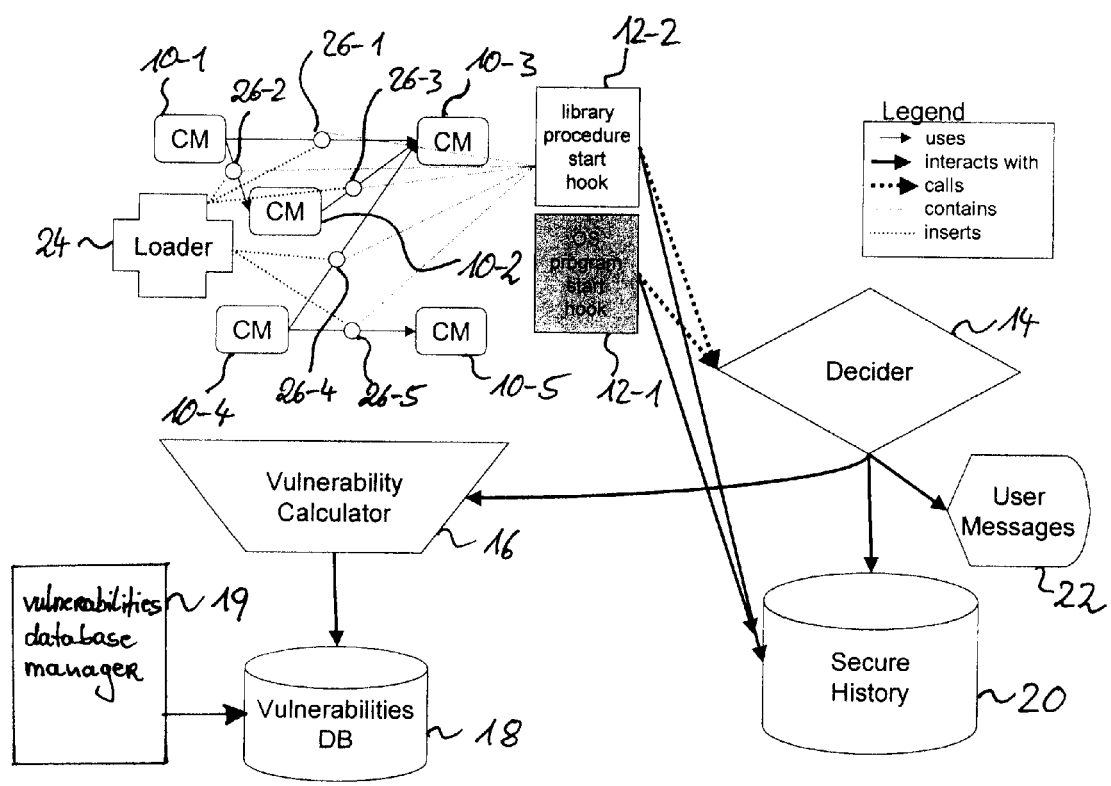
FIG. 1 shows a block diagram of various functional components of an preferred embodiment of the present invention along with components of the computer system which is to be protected.

The preferred embodiment of the present invention detects vulnerabilities of a code portion based on published or pre-existing information about vulnerabilities concerning a code portion or code portions affected by a vulnerability. A vulnerability is a security problem of a part of a single code module. As soon as a vulnerability is published by a defender or has been detected by an attacker, an "exploit" can be created. An exploit is code of any kind that employs a vulnerability in order to attack a computer system. After an exploit has been created, it can be used to attack a system until the vulnerability is removed by applying a fix (or patch) on that system. Exploits that exist before the corresponding fix is published are called "zero-day exploits". Zero-day exploits can be further categorized into "fast exploits" meaning that the corresponding vulnerability is already published but not the fix (in the meaning of "the time difference between vulnerability publication and exploit creation is 0 days") and into "secret exploits" meaning that the vulnerability is not even published yet.

The embodiment provides a system for reducing the number of false positives (assumed attacks which are not attacks), thereby reducing the number of wrongfully prevented operations and, thus, providing a larger user comfort. In the embodiment, code portions for which vulnerabilities are found, are aborted or prevented from execution only when a special condition is not met. This condition is based on the thesis that such program starts or external procedure executions are not malicious that took place before the publication date of the corresponding vulnerability. This thesis is true in the case of fast exploits, but not in the case of secret exploits, therefore the embodiment cannot prevent the latter. To implement this, the parameter sets that are used for program start and procedure execution are recorded and the special condition checks whether after the corresponding publication date one of the recorded parameter sets is used for a program start or procedure execution. In this case, the special condition is met, and the corresponding action is allowed. In all other cases, the special condition is not met. However, the special condition can only be applied for vulnerabilities where the parameter set used for an attack is different from the one used for benign usages (non-usual-usage type vulnerabilities). For all other vulnerabilities (normal-usage type vulnerabilities), the special condition shall therefore never be met. The vulnerabilities are therefore categorized into two groups: Non-usual-usage type vulnerabilities and normal-usage type vulnerabilities. Non-usual-usage type vulnerabilities require non-usual parameters in order to be exploited. This type forms the bigger part of vulnerabilities because usual-type vulnerabilities are normally found already in the test phase at the manufacturer or very early during usage in the field. This means that, normally, parameters of non-attack usages do not lead to the exploitation of a vulnerability. Therefore, firstly, the statement of parameters in order to exploit a vulnerability can take place only after the publication date of the vulnerability. Secondly, statements of parameters before this publication date do not lead to the exploitation of the vulnerability. Normal-usage type vulnerabilities form the smaller group of vulnerabilities that do not require unusual parameters in order to be exploited. For example, there are severe vulnerabilities that prevent the evaluation of passwords for privileged accounts. However, using the wrong password for an account is a normal use of a login system. Therefore, it is not possible to distinguish "secure" from "insecure" data and code modules for which such vulnerabilities exist must not be executed unless a corresponding fix is applied.

FIG. 1 shows a block diagram of various functional components of the protection system of the preferred embodiment of the present invention along with components of the computer system which is to be protected from attacks exploiting known security vulnerabilities and the interrelation of the components.

The protection system involves three groups of components. The first group consists of the code modules (CM) 10-1, 10-2, 10-3, 10-4, 10-5 installed on the computer system which is under the control of an operating system (OS). The code module do have a "uses" relationship among themselves. For example, code module 10-1 uses code modules 10-2 and 10-3 and code module 10-2 uses code module 10-3. The second group consists of a plurality of hooks 12-1, 12-2, some of which may be part of the OS. The hooks which are part of the OS are called by the OS in case of certain corresponding operations by the OS. Normally, an OS provides a hook 12-1 for starting a program (i.e. executing a code module 10). An additional hook 12-2, termed library procedure start hook 12-2, is called in case a code module 10 seeks to execute a procedure of another code module 10. A hook corresponding to this operation, is normally not provided by an OS. The hooks 12 then call a decider 14 which provides a decision either to allow or deny to continue executing their corresponding functionality (e.g. starting a program, executing a library procedure). The decider 14 consults a vulnerability calculator 16 in order to obtain parameter test procedures and an oldest publication date (OPD) of the vulnerabilities involved in the corresponding OS operation. The vulnerabilities calculator 16 in turn consults a vulnerabilities database 18 in order to determine the parameter test procedures and the OPD. The vulnerabilities database 18 is maintained by a vulnerabilities database manager 19. The decider 14 also consults a secure history component 16 in order to obtain a relevant date (RD) of the corresponding OS operation. Additionally, for every allowed operation, the hooks 12 or the decider 14 report corresponding data to the secure history component 20. The decider 14 communicates with the user via a user messages component 22 in case it rejects an operation. A loader 24 determines (e.g. reads) the "uses" relation of code modules 10 and inserts calls 26-1, 26-2, 26-3, 26-4, 26-5 to the library procedure start hook 12-2 into the code modules 10 in location just before code sections where these code modules 10 call procedures of other code modules 10. The loader 24, the decider 14, the secure history 20, the vulnerability calculator 16, vulnerabilities database 18, the vulnerability database manager 19 and the user messages 22 form the third group of components. In the preferred embodiment, the code modules 10, decider 14, the hooks 12, the (dynamic) loader 24, the vulnerability calculator 16 and the database manager 19 and the secure history component 20 are executed locally, that is, are executed on the same computer system using resources of the same CPU. However, at least some of the components can be executed non-locally, for example, within the same security domain as the protected computer system.

In the following these components will be explained in more detail.

Figure 2:
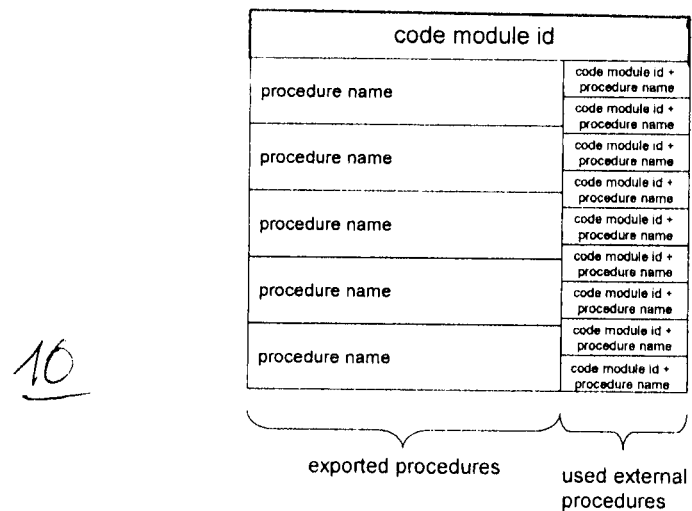
FIG. 2 shows a schematic view of a code module 10 and FIG. 3 shows a flow diagram of program logic executed by a decider component of the present invention.

FIG. 2 shows a schematic view of a code module 10. The code modules 10 are components that are handled by the OS and that are distinct and identifiable portions of executable code. Some code modules (e.g. module 10-1) can be started by the OS by calling something like a "main" or "start" procedure which is part of the code module 10. These code modules 10 are termed "programs". Just before starting the program, the OS program start hook is activated (called) by the OS. Other code modules (e.g. module 10-3) provide procedures (functions) used by other code modules 10 and are termed "libraries". A code module (e.g. module 10-2) may be both a program and a library.

Every code module 10 has an identifier (ID) including a version number and comprises one or more exported procedures. For each of the exported procedures, the procedure name can be identified. Often code modules contain a list of used external procedures, that is, procedures that are called by the exported procedures and that exist in other code modules 10. Therefore, the used external procedures are identified by the code module IDs the used procedures are contained in and the procedure names of these procedures. There is a n:m relation between the exported procedures and the used external procedures which is not easy to determine. This means that, in case the relation can not be determined, it is only known which code module 10 uses which external procedure, but that it is not known which procedure of the code module 10 uses which external procedure. The latter information however is desirable because in some constellations it leads to less information processing required to be performed by the present invention. This case however is not treated in the following as the required modification and adaption are apparent to the skilled person. The list of used external procedures establishes the "uses" relation between a first code module 10 and the other code modules 10 whose procedures are used by the first code module 10.

Figure 3:
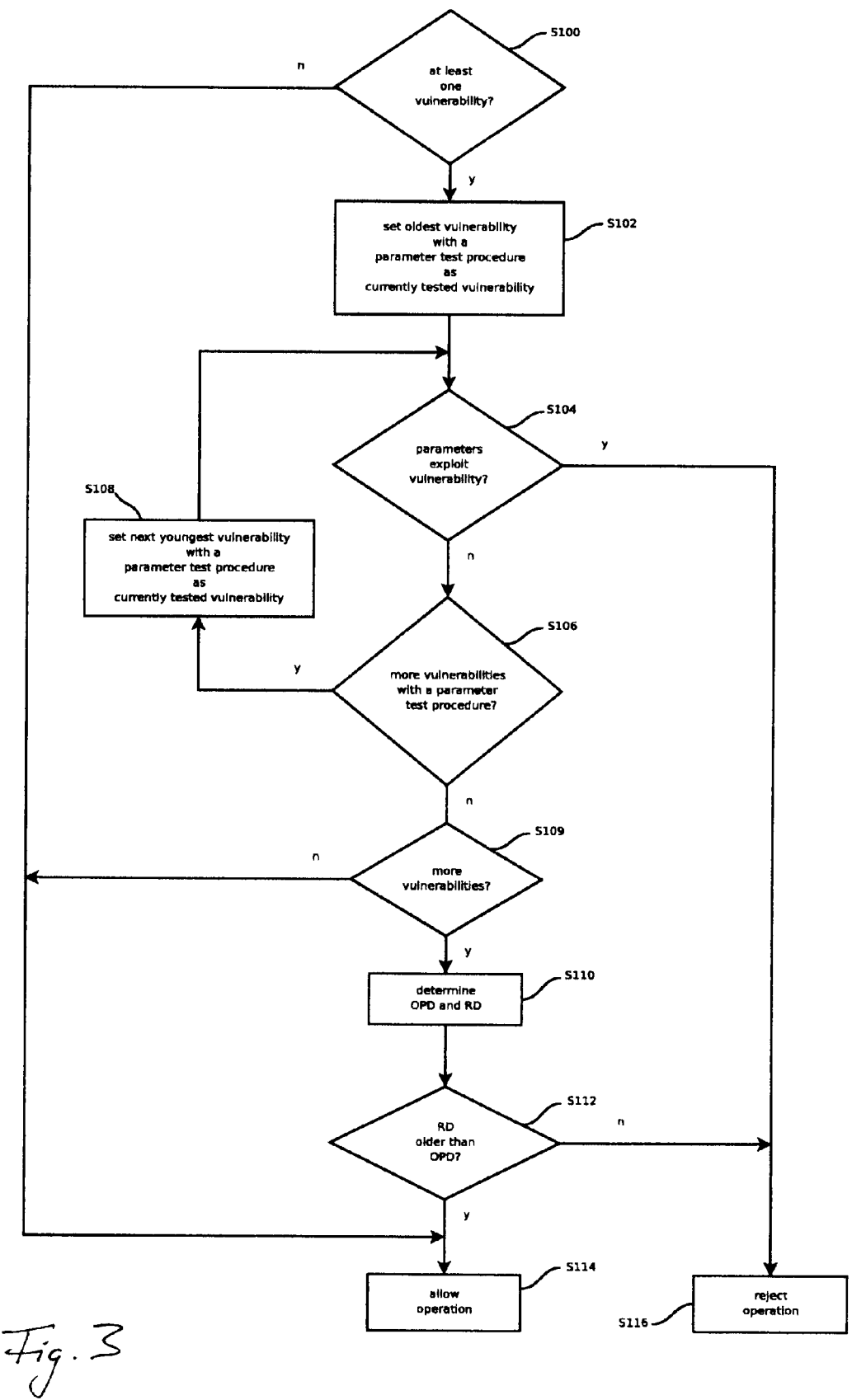

The services an OS provides are based on the service of a number of basic procedures. These basic procedures are termed "hooks" and can be used to add a protection system like the one described in this invention to the OS by inserting a conditional statement in these procedures. This statement first queries the decider 14. The output of the decider 14 is either a positive (FIG. 3, S114) or a negative (FIG. 3, S116) decision. Upon a positive decision, the conditional statement is left and the OS code continues to execute as it would do without the statement. Upon a negative decision, the basic OS procedure is not executed but is aborted with an appropriate error message. In the embodiment, there is assumed to be an OS hook 12-1 for the "start program" operation. An additional hook termed "library procedure start hook" 12-2 is provided that is normally not offered by an OS. The "library procedure start hook" 12-2 shall be called before a code module (e.g. module 10-1) calls a procedure in an other code module (e.g. module 10-2). If this hook is not automatically called in an OS, the loader component 24 inserts a call (e.g. call 26-2) to it. This technique of "overlaying" existing basic OS procedures with code of another system is well known and is used in allowed applications such as virus scanners and in malicious "applications" such as root kits. Apart from adding such code to an OS afterwards, it can of course also be integrated into a normal version of the OS.

The normal loader 24 in an OS is the component that runs mainly when a program is started. The loader 24 loads and examines the code module (e.g. module 10-1) corresponding to the program and states the list of code modules (in this example modules 10-2, 10-3) the first code module 10-1 "uses". This "uses" relation is a list of procedures of other code modules 10-2, 10-3 the first code module 10-1 calls. The loader 24 loads the "used" code modules 10-2, 10-3 and changes the first code 10-1 module in a way that it can call the corresponding procedures directly. The loader 24 then examines the "used" code modules 10-2, 10-3 for a list of code modules 10-3 they "use" and continues as before until the transitive closure (in this example the modules 10-2, 10-3) of "used" code modules is loaded and all procedures can be called directly. This mechanism is called dynamically linking.

The embodiment extends this normal loader 24 by the ability to add a call 26 to the library procedure start hook 12-2 every time a procedure call to another code module 10 is found and processed. One way to use this ability is to indeed add this call 26 to every procedure call. However, this results in a large runtime overhead caused by the protection mechanism, as all library procedure calls cause a decider query. The overhead can be diminished by omitting the insertion of calls 26 to the library procedure start hook 12-2 for modules/procedures for which no vulnerability exists. In case the calls 26 are omitted as described and a new vulnerability of a code module 10 or of one of its external procedures that is potentially accessed by a currently executing program is input into/by the protection system, the program has to be stopped and re-loaded with the corresponding call(s) 26 inserted.

Apart from being used when a program is started, the loader 24 can also be called directly by a code module 10 in order to establish load another code module 10 explicitly. Finally, the loader 24 can act also after compiling the program in order to "statically link" a code module (e.g. module 10-1) with the transitive set of its "used" code modules (in this example modules 10-2, 10-3) in order to generate a new code module that already contains the "used" code modules (in this example modules 10-1, 10-2, 10-3) without the need for dynamically loading them. For "statically linking", the same mechanisms are applied as for dynamically linking.

The decider 14 is called by the different hooks 12 in order to decide whether the corresponding operation shall be executed or not from a security point of view. In order to allow the decider 14 to make this decision, the hooks 12 deliver the code module identifier, the called procedure name (in case of a program start, this the "main" or "start" procedure, omission of the procedure name might be defined to indicate this procedure) and the parameters involved in the operation, for example, the parameters used in calling a program or external procedure (i.e. the input parameters of a program or of an external procedure) to the decider 14. The decider 14 then first queries the vulnerability calculator 16 for vulnerabilities and other data by feeding the code module identifier and, if available, the called procedure name to the vulnerability calculator 16.

The vulnerability calculator 16 answers with one of two possible results:
  a) There is no (unfixed) vulnerability.
  b) There is at least one (unfixed) vulnerability. In this case, the vulnerability calculator 14 returns a time-ordered list of publication dates for the vulnerabilities and, if available, one parameter test procedure per vulnerability.

FIG. 4 shows a flow diagram of program logic executed by the decider 14 upon reception of the query result from the vulnerabilities calculator 16.

In step S100 the decider 14 determines whether or not there is at least one vulnerability according to the result from the vulnerability calculator. In case of result a), the decider 14 proceeds to step S114. In case of result b), the decider 14 proceeds to step S104.

In step S102 the decider 14 sets the oldest vulnerability with a parameter test procedure as the currently tested vulnerability and proceeds to step S104. For vulnerabilities of the normal usage type a parameter test procedure that always yields true (meaning that the parameters indeed exploit the vulnerability) is always defined. Therefore, the decision of step S112 (see below) will never be taken for a normal usage type vulnerability and the "special condition" is never met.

In step S104, the parameter test procedure of the currently tested vulnerability is executed on the parameters. In case that the parameter test procedure finds that the parameters do exploit the currently tested vulnerability, the decider 14 proceeds to step S116, otherwise the decider 14 proceeds to step S106.

In step S106, in case that there are more vulnerabilities with a parameter test procedure, the decider 14 proceeds to step S108, otherwise the decider 14 proceeds to step S109.

In step S108, the decider 14 sets the next youngest vulnerability with a parameter test procedure as the currently tested vulnerability (e.g., in case that the oldest vulnerability with a parameter test procedure is currently set as the currently tested vulnerability, the second oldest vulnerability with a parameter test procedure is set as the currently tested vulnerability) and proceeds to step S104.

In step S109, the decider 14 determines if untested vulnerabilities (i.e. vulnerabilities without a parameter test procedure) remain. If no (i.e. in case that for all vulnerabilities a parameter test procedure is defined), the decider proceeds to step S114. If yes, the decider proceeds to step S110.

In step S110, the decider 14 determines the oldest publication date (OPD), which is the publication date of the oldest vulnerability without a parameter test procedure. The decider 14 further determines the relevant date (RD). The RD is retrieved from the secure history component 20 as an answer to a corresponding request comprising the code module identifier, the called procedure name (eventually the "main procedure") and the parameters involved in the operation.

In step S112, the decider 14 determines whether the operation was executed before the publication of the oldest vulnerability without a parameter test procedure, that is, the decider 14 determines if the RD is older than the OPD. If yes, the decider 14 proceeds to step S114. If no, that is, in case the RD is younger or equally old as the OPD, the decider 14 proceeds to step S116. This steps corresponds to the evaluation of the "special condition".

In step S114 the decider 14 allows the operation and lets it henceforth continue normally. After this happened, the data the hook 12 delivered to the decider 14 is transferred to the secure history component 20. Alternatively, the hook 12 delivers the data to the secure history component 20.

In step S116 the decider 14 rejects the operation and informs the user via the user messages component 22 about the rejection and about the vulnerability that caused the rejection. To provide a higher user comfort, the decider 14 may add information about which patches/fixes can be applied to fix the vulnerability and have the functionality back, where to get the patches/fixes and/or which program can be used instead. For even more comfort, the decider 14 may offer to install the corresponding patches/fixes or even cause the automatic installation of the patches/fixes without questioning the user.

When rejecting the execution of an operation there are two possibilities for what happens to the further execution of the program during which the operation occurred. In the first case, the decider 14 does not know how to ensure that the program can be continued and has to stop the program. A problem with this case is that the operation returns without being executed, so that side effects might not happen or return values might not be produced that are needed for continuing the program. As a result, the program might fail later on unexpectedly. Therefore, corresponding to the second case, the corresponding vulnerability entry in the vulnerability database 18 advantageously provides a "shortcut" procedure that is executed instead of the original operation and that ensures that the program can continue.

It is to be noted that, as a consequence, a program can run for a longer period of time and suddenly be stopped during a functionality this program was able to do before. This might happen e.g. when a new vulnerability concerning this program was found and the program hit an operation which the decider 14 rejects due to that vulnerability.

The described program is effected also in the case where a program is already running and the protection system becomes aware of one or more new vulnerabilities concerning the running program. In this case, the control logic starting in step S100 is executed operating on the one or more new (previously untested) vulnerabilities. In this case, the decider 14 is called when the protection system becomes aware (typically after an update of the vulnerabilities database 18) of the one or more new vulnerabilities relative to the running application. To this end, the running applications must be known. The determination of the running applications may be based on a service for listing running applications, which is normally provided by the OS. If not provided by the OS, the protection system may provide the service.

It can be seen from FIG. 4 that, in case there is a parameter test procedure for each vulnerability in the list provided by the vulnerability calculator 16 and all parameter test procedures do not find vulnerability exploiting parameters, the decider 14 allows the operation and the program continues.

Cleary, the program logic of FIG. 4 can be modified in many ways still providing the same result on the same input.

For example, the timely order of the "RD younger than OPD?" test block (centered on step S112) and the "parameter test procedures" test block (centered on step S104) may be reversed or the "RD younger than OPD" test block may be executed when the first vulnerability without a parameter test procedure is encountered in the time-ordered (youngest first) sequence. Such modification may be advantageous in terms of time/processing power required to obtain the decider's result. In many cases, a modification which is fast when the branch (step S114) allowing the operation is taken is advantageous.

The user messages component 22 allows the decider 14 to communicate with the user in case it rejects the execution of an operation. The user messages component makes use of the input and output devices of the computer system.

The vulnerability calculator 16, given the ID of a code module and, if available, a procedure name, calculates whether there are vulnerabilities concerning this code module or code module/procedure name combination. If there are such vulnerabilities, the vulnerability calculator 16 returns a time-ordered list of the publication dates of these vulnerabilities together with their optional parameter test procedures. To that end, the vulnerability calculator 16 queries a vulnerabilities database 18. Due to performance reasons (a live query for every query by the decider 14 would require too much time and generate too much network load), the vulnerabilities database 18 is locally replicated restricted to those entries of one or more remote/primary databases that are pertinent given the computer system's OS and hardware, the installed code modules and the installed fixes. It is likely that, at least partly, existing vulnerability databases can be used as prime/remote databases. A replicated entry is not limited to mean an exact copy of the entry, rather the relevant information of the prime entry or a plurality of prime entries is extracted and stored in a form suitable for further processing. To keep the local entries up to date, the remote/primary vulnerability databases are queried periodically. The maintenance of the vulnerability database 18, including, notably, the selection or determination of pertinent vulnerability entries to be replicated, is controlled and/or effected by the vulnerability database manager 19. To this end, the vulnerability database manager 19 acquires and collects information identifying the code modules 10, fixes, OS, and hardware of the protected computer system. The operation of the vulnerability database manager 19 may partly be based on the techniques, services and programs the OVAL framework provides. Vulnerability database entries are not considered to be constant. Instead, updated entries in the remote/primary databases are also updated in the replicated copy. Finally, fixing vulnerabilities can change the vulnerabilities database 18 as entries are removed that are not relevant to the computer system. The vulnerability database 18 contains a list of all published vulnerabilities (i.e. "published vulnerability" relates directly to the accessibility in this database). The embodiment uses the following fields in a vulnerability entry in the vulnerability database 18:

ID of vulnerability (this might be a Common Vulnerabilities and Exposures (CVE) reference)
    publication date of vulnerability
    code module(s) concerned by vulnerability, including per code module:
        an identifier (ID) of the code module (including its version number)
        the concerned Operating System (including the OS version number)
        IDs (names) of affected exported procedures inside the code module (if applicable)
        a trust factor (between 0 and 1.0) denoting the trust of the vulnerability database whether this entry refers really to a vulnerability or is just a fake entry (optional)
        a shortcut procedure (if applicable)
        a parameter test procedure (if applicable)
        hardware requirements (if applicable)

Alternatively, the vulnerability database 18 can be remote (i.e. accessed over a network) and may be centralized or distributed.

In order to be able to provide the RD, the secure history component 20 stores all parameters of operations together with an operation identifier (operation ID), the concerned code module ID and, if applicable, the concerned procedure ID that have been allowed by the decider 14 in a database. The source of these parameters might be either the decider 14 or the corresponding hooks 12. The parameters can be stored in one of several ways. These ways include:

All data is stored completely together with a time stamp. This possibility consumes the most amount of memory.
    All data is stored "completely" together with a time stamp, but for every parameter that is larger than the memory needed for a secure hash value that is sufficiently secure, this secure hash value of the parameter is stored. In this case, the secure hash value of the parameters are compared and not the parameters themselves.

The amount of storage required and the protection system overhead (time/processing power) caused by storing the data can be diminished by not always storing parameters, but, for example, just in every nth time interval. This reduces the number of parameter sets recorded, which might lead to more false rejects by the decider 14 and, thus, reduced user comfort.

If queried by the decider 14, the secure history component 20 calculates the RD out of the parameters of an operation. To that end, it regards the parameters as a set of parameters. If this set of parameters is found in the database as having already occurred for the given operation, code module and, if applicable, procedure, the returned RD is the date when this parameter set was stored initially. If this parameter set is not found as being stored for the given operation, code module and, if applicable, procedure, today's date is returned as the RD. Dates are 'day exact' in the embodiment. More or less fine grained dates are possible however. In order to reduce the memory needed, the secure history component 20 can differentiate parameter sets that are used once and such that are used more often. Parameter sets that are used once can be removed from the secure history after some time without a loss of comfort for the user.

In case a parameter is an address or a link of any kind referring to further data, which the code module or procedure uses to obtain said data, a security threat might arise from the parameter itself and from the data to which it refers. In this case, both threats must be considered independently and it is beneficial to think of the parameter as comprising itself and the data to which it refers. However, this approach increases the complexity of the system and requires knowledge of the module's or procedure's operation.

In the following, two examples of the embodiment's operation will be given.

In the first example, an exploit is recognized correctly. In the example, an attacker seeks to exploit a vulnerability in a GIF viewer that is integrated in a web browser that allows specially coded GIF pictures to let the viewer execute code contained in the picture. To that end, the attacker places a corresponding GIF picture on a web page. The vulnerability was published on 1 Jan. 2005. Upon starting the web browser (e.g. corresponding to code module 10-1) on 1 Feb. 2006, the loader 24 adds calls 26-1, 26-2 to the library procedure start hooks 12-2 to all external procedure calls. Then, the decider 14 queries the vulnerability calculator 16 for potential vulnerabilities of the browser 10-1. The vulnerability calculator 16 states a number of code modules 10-2, 10-3 the browser uses. Among these modules 10-2, 10-3 is the GIF library 10-3 that contains the published vulnerability. The decider 14 is updated with this information. As there are no other vulnerabilities, the OPD for the vulnerabilities of the web browser 10-1 is 1 Jan. 2005. The web browser 10-1 is started without parameters, as it was started many times even before 1 Jan. 2005. Therefore, the decider 14 allows to start the web browser. Upon googling for a certain term, the user finds the attacker's web page and the browser aims to display the GIF picture by calling the corresponding procedure in the GIF library 10-3. The code hits the inserted call 26-1 to the library procedure start hook 12-2 and the decider 14 compares the parameters of the procedure call to the previously stored parameters using the secure history 20. As the picture data, which is one of the parameters, was never displayed before, the secure history 20 returns today's date as the RD. The decider 14 compares this date to the OPD for this call, states that it can contain an exploit and, thus, rejects the procedure call. The decider 14 executes the "failure case" code (including the shortcut procedure) for this call, and informs the user about the denial together with some hint which fix to apply using the user messages component 22.

In the second example, a false alarm is raised. In this example, as in the first example, the user starts the browser 10-1 successfully. Upon googling for a certain term, the user finds a web page containing a GIF that does not contain an exploit. Again, the browser aims to display the GIF picture by calling the corresponding procedure in the GIF library 10-3. The code hits the inserted call 26-1 to the library procedure start hook 12-2 and the decider 14 compares the parameters of the procedure call to the previously stored parameters using the secure history 20. As the picture data, which is one of the parameters, was never displayed before, the secure history returns today's date as the RD. The decider 14 compares this date to the OPD for this call, states that it can contain an exploit and, thus, denies the procedure call. The decider 14 executes the "failure case" code (including the shortcut procedure) for this call, and informs the user about the denial together with some hint which fix to apply using the user messages component 22. As a consequence, the user cannot watch the GIF picture although the GIF picture did not contain an exploit.

The embodiment supports rough vulnerability entries in vulnerability databases as well as detailed ones and can cope with the evolution of the first into the latter. Rough vulnerability entries can be created fast. Only the ID, date, and the overall code module (using the main procedure in doubt) are enough to protect the computer system from being attacked by this vulnerability until the corresponding fix is written and applied. As a consequence, rough vulnerability entries more often lead to the rejection or interruption of a program start (and therefore a low level of user comfort). After a rough vulnerability entry was written, more time can be invested to examine the nature of the vulnerability. Afterwards, the entry can for example be refined for the procedures that are used, and parameter test and shortcut procedures can be written. As soon as such an entry is updated, the invention can react on it, thus resulting in a higher level of user comfort.

Depending on the policy of a consulted vulnerability database, it can be possible for an attacker to add fake vulnerability entries. When the fake entries are delivered to the vulnerability calculator 16 they could prevent the usage of programs or subsystems and make the computer system practically unusable so the user might be tempted to switch off the protection system. Therefore it is important to use only such databases that verify every vulnerability entry.

The level of comfort for the user differs with the question whether vulnerabilities can be associated with the usage of external procedures and their parameters. This typically is not the case for vulnerabilities that are caused by network communication as there is no need for crossing an external interface, where the network communication acts occur as parameters (network communication functionality is typically provided with some internal procedures whose structure is hard to discover from the outside). By adapting such programs in a way that exactly this (processing network communication acts as parameters of a external interface) happens, the protection the invention offers can also be provided to these programs with a higher level of comfort for the user.

Apart from vulnerabilities that use parameters in order to attack a system, there are other vulnerabilities that are based on external input to the code module. For these other vulnerabilities it is not enough to just record all such input and time-stamp it in order to have a set of "secure" input. Instead, also the state of the code module and the communication history needs to be taken into account. This can take place analogous to F. Hohl, K. Rothermel, A Protocol Preventing Blackbox Tests of Mobile Agents, Tagungsband der ITGNDE Fachtagung Kommunikation in Verteilten Systemen (KiVS'99), Springer-Verlag, 1999.

The protection system of the embodiment
automatically protects computer systems from attacks by exploiting published vulnerabilities, thus e.g. preventing buffer overflow attacks,
corrupt media files attacks,
ordinary users becoming administrator users in multi-user systems,
prevents services that have not been fixed from being attacked,
prevents attacks by fast exploits,
reacts timely given the timely access to a vulnerability database,
motivates users to apply fixes,
can tell users which fixes to apply in order to be able to use a service,
needed infrastructure mainly already exists,
considers more than just viruses, malware, or the OS,
requires no admin knowledge,
requires only fixes of which the vulnerabilities really occur and
does not require applications to be recompiled.

It is very important to not reject operations that are needed for fixing patches on the computer system because then execution restrictions caused by the invention can never be removed. These operations obviously include "applying patches" operations, but also every operation that is needed before, for example the "login as super user" operation.

While the present invention has been explained with reference to specific embodiments, this is by way of illustration only and it will be readily apparent to those skilled in the art that various modifications may be made therein without departing from the scope of the following claims.

The invention claimed is:

1. A method for automatically protecting a computer system from attacks that exploit security vulnerabilities, comprising:
detecting requests for execution of code portions;
determining vulnerabilities of a code portion, for which an execution request is detected, providing a secure history determination result indicating whether or not a parameter set used to call the code portion was used before the publication of an oldest vulnerability of the code portion;

evaluating whether or not the execution of the code portion shall be prevented in a case at least one vulnerability concerning the code portion is determined; and preventing the execution of the code portion if determined to do so in the evaluating, wherein the evaluating is based on the secure history determination result, wherein one or more parameter test procedures are defined, whereby each parameter test procedure of the one or more parameter test procedures is specific to a different one of said vulnerabilities and provides a result value when executed that indicates if a parameter set used to call the code portion exploits this vulnerability or not, and wherein the evaluating is based on one or more of said result values of the one or more parameter test procedures.

2. A method according to claim 1, wherein said code portion is a procedure external to a requesting code module issuing said request for execution, said method, in a case the execution of said code portion is prevented, further comprising:

executing in place of said prevented code portion a shortcut procedure that ensures that said requesting code module can continue.

3. A method according to claim 1, wherein said vulnerabilities are known vulnerabilities.

4. A method according to claim 1, further comprising:

providing a secure history determination result indicating whether or not a parameter set used to call the code portion was used before the publication of a first vulnerability of the code portion, wherein the evaluating is based on the secure history determination result.

5. A method according to claim 4, wherein said first vulnerability is an oldest vulnerability of the code portion without a parameter test procedure.

6. A method according to claim 1, further comprising:

determining which fixes need to be applied to allow for a secure execution of a code portion of which the execution is prevented or aborted; and presenting a user said fixes and/or applying said fixes.

7. A method according to claim 1, further comprising:

determining what other code portion might be used instead of the one of which the execution was prevented or aborted; and presenting a user said other code portion.

8. A method according to claim 1, wherein for each code portion there is an associated code portion identifier, and the determining vulnerabilities of a code portion is based on querying a database that holds associations of vulnerabilities with code portion identifiers, wherein a vulnerability is determined to be a vulnerability of the code portion when the database holds an association of the vulnerability with the code portion identifier of the code portion.

9. A computer software product including a non-transitory computer-readable storage medium storing a program which, when executed on a processing device, is adapted to perform a method for automatically protecting a computer system from attacks that exploit security vulnerabilities, comprising:

detecting requests for execution of code portions;

determining vulnerabilities of a code portion, for which an execution request is detected, providing a secure history determination result indicating whether or not a parameter set used to call the code portion was used before the publication of an oldest vulnerability of the code portion;

evaluating whether or not the execution of the code portion shall be prevented in a case at least one vulnerability concerning the code portion is determined; and preventing the execution of the code portion if determined to do so in the evaluating, wherein the evaluating is based on the secure history determination result, wherein one or more parameter test procedures are defined, whereby each parameter test procedure of the one or more parameter test procedures is specific to a different one of said vulnerabilities and provides a result value when executed that indicates if a parameter set used to call the code portion exploits this vulnerability or not, and wherein the evaluating is based on one or more of said result values of the one or more parameter test procedures.

10. A method for automatically protecting a computer system from attacks that exploit security vulnerabilities, comprising:

detecting code portions that are currently executed, determining vulnerabilities of a code portion that is currently executed, providing a secure history determination result indicating whether or not a parameter set used to call the code portion was used before the publication of the oldest vulnerability of the code portion;

evaluating whether or not the execution of the code portion shall be aborted in a case at least one vulnerability concerning the code portion is determined; and aborting the execution of the code portion if determined to do so in the evaluating, wherein the evaluating is based on the secure history determination result, wherein one or more parameter test procedures are defined, whereby each parameter test procedure of the one or more parameter test procedures is specific to a different one of said vulnerabilities and provides a result value when executed that indicates if a parameter set used to call the code portion exploits this vulnerability or not, and wherein the evaluating is based on one or more of said result values of the one or more parameter test procedures.

11. A method according to claim 10, wherein said vulnerabilities are known vulnerabilities.

12. A method according to claim 10, further comprising providing a secure history determination result indicating whether or not a parameter set used to call the code portion was used before the publication of a first vulnerability of the code portion, wherein the evaluating is based on the secure history determination result.

13. A method according to claim 12, wherein said first vulnerability is an oldest vulnerability of the code portion without a parameter test procedure.

14. A method according to claim 10, further comprising:

determining which fixes need to be applied to allow for a secure execution of a code portion of which the execution is prevented or aborted; and presenting a user said fixes and/or applying said fixes.

15. A method according to claim 10, further comprising:

determining what other code portion might be used instead of the one of which the execution was prevented or aborted; and presenting a user said other code portion.

16. A method according to claim 10, wherein for each code portion there is an associated code portion identifier, and the determining vulnerabilities of a code portion is based on querying a database that holds associations of vulnerabilities with code portion identifiers, wherein a vulnerability is determined to be a vulnerability of the code portion when the database holds an association of the vulnerability with the code portion identifier of the code portion.

17. A computer software product including a non-transitory computer-readable storage medium storing a program which, when executed on a processing device, is adapted to perform a method for automatically protecting a computer system from attacks that exploit security vulnerabilities, comprising:

detecting code portions that are currently executed, determining vulnerabilities of a code portion that is currently executed, providing a secure history determination result indicating whether or not a parameter set used to call the code portion was used before the publication of the oldest vulnerability of the code portion;

evaluating whether or not the execution of the code portion shall be aborted in a case at least one vulnerability concerning the code portion is determined; and aborting the execution of the code portion if determined to do so in the evaluating, wherein the evaluating is based on the secure history determination result, wherein one or more parameter test procedures are defined, whereby each parameter test procedure of the one or more parameter test procedures is specific to a different one of said vulnerabilities and provides a result value when executed that indicates if a parameter set used to call the code portion exploits this vulnerability or not, and wherein the evaluating is based on one or more of said result values of the one or more parameter test procedures.

18. A method for automatically protecting a computer system from attacks that exploit security vulnerabilities, comprising:

detecting requests for execution of code portions;

determining vulnerabilities of a code portion for which an execution request is detected;

evaluating whether or not the execution of the code portion shall be prevented in a case at least one vulnerability concerning the code portion is determined;

preventing the execution of the code portion if determined to do so in the evaluating;

and a secure history determination step providing a secure history determination result indicating whether or not a parameter set used to call the code portion was used before the publication of an oldest vulnerability of the code portion, wherein the evaluating is based on the secure history determination result, wherein one or more parameter test procedures are defined, whereby each parameter test procedure of the one or more parameter test procedures is specific to a different one of said vulnerabilities and provides a result value when executed that indicates if a parameter set used to call the code portion exploits this vulnerability or not, and wherein the evaluating is based on one or more of said result values of the one or more parameter test procedures.

19. A method for automatically protecting a computer system from attacks that exploit security vulnerabilities, comprising:

detecting code portions that are currently executed; determining vulnerabilities of a code portion that is currently executed;

evaluating whether or not the execution of the code portion shall be aborted in a case at least one vulnerability concerning the code portion is determined;

aborting the execution of the code portion if determined to do so in the evaluating;

and a secure history determination step providing a secure history determination result indicating whether or not a parameter set used to call the code portion was used before the publication of the oldest vulnerability of the code portion, wherein the evaluating is based on the secure history determination result, wherein one or more parameter test procedures are defined, whereby each parameter test procedure of the one or more parameter test procedures is specific to a different one of said vulnerabilities and provides a result value when executed that indicates if a parameter set used to call the code portion exploits this vulnerability or not, and wherein the evaluating is based on one or more of said result values of the one or more parameter test procedures.

* * * * *